United States Patent
Kato et al.

[11] 4,043,309
[45] Aug. 23, 1977

[54] INTERNAL COMBUSTION ENGINE HAVING AUXILIARY COMBUSTION CHAMBER

[75] Inventors: Takashi Kato; Koichi Hoshi; Norihiko Nakamura, all of Susono, Japan

[73] Assignee: Toyota Jidosha Kogyo Kabushiki Kaisha, Toyota, Japan

[21] Appl. No.: 503,178

[22] Filed: Sept. 4, 1974

[30] Foreign Application Priority Data

Apr. 25, 1974 Japan .................. 49-45513[U]

[51] Int. Cl.² ............................................. F02B 23/00
[52] U.S. Cl. ......................... 123/191 SP; 123/32 C; 123/32 K
[58] Field of Search ............ 123/32 K, 32 SA, 32 SP, 123/32 C, 32 B, 191 S, 191 SP, 32 ST, 191 B

[56] References Cited
U.S. PATENT DOCUMENTS

| | | | |
|---|---|---|---|
| 1,369,177 | 2/1921 | Kraft | 123/191 SP |
| 1,523,454 | 1/1925 | Shepherd | 123/191 SP |
| 1,671,740 | 5/1928 | Phillips | 123/191 S X |
| 2,708,428 | 5/1955 | Fisher | 123/191 S |
| 2,924,210 | 2/1960 | Summers | 123/191 |
| 3,402,704 | 9/1968 | Witzky et al. | 123/191 SP X |
| 3,776,212 | 12/1973 | Karlowitz | 123/32 SP X |

FOREIGN PATENT DOCUMENTS

| | | | |
|---|---|---|---|
| 994,233 | 11/1951 | France | 123/32 C |
| 1,526,290 | 4/1970 | Germany | 123/32 SP |
| 922,311 | 11/1954 | Germany | 123/32 SA |
| 868,993 | 2/1953 | Germany | 123/32 SA |

*Primary Examiner*—Wendell E. Burns
*Assistant Examiner*—William Randolph
*Attorney, Agent, or Firm*—Stevens, Davis, Miller & Mosher

[57] ABSTRACT

An internal combustion engine having an auxiliary combustion chamber in communication with the main combustion chamber through a nozzle, and the discharging gap of the spark plug for ignition of the mixture is positioned adjacent the opening of the nozzle in the main combustion chamber.

7 Claims, 4 Drawing Figures

INTERNAL COMBUSTION ENGINE HAVING AUXILIARY COMBUSTION CHAMBER

BACKGROUND OF THE INVENTION

1. Field of the Invention

This invention relates to an internal combustion engine provided with an auxiliary combustion chamber in communication with the main combustion chamber through a nozzle, and more particularly to such internal combustion engine wherein the fuel-air mixture burned in the auxiliary combustion chamber is provided from the main combustion chamber.

2. Description Of The Prior Art

As a measure for cleaning the exhaust gas released from an internal combustion engine, methods were proposed in which generation of harmful gas components is suppressed. According to these methods, the mixture supplied into the combustion chamber in the engine is considerably reduced in concentration to minimize formation of unburned gases.

These methods, however, had the problems of deteriorated ignitability and poorer engine efficiency and also it was necessary to advance the ignition time enough to cover up retarded burning velocity resulting from the use of a lean mixture. As a solution to this problem, it was proposed to provide an auxiliary combustion chamber in communication with the main combustion chamber through a passage, and to dispose a spark plug in said auxiliary combustion chamber, thereby to improve ignitability and to increase burning velocity to obtain stabilized combustion for the engine using a lean mixture. According to this system, the mixture introduced into the main combustion chamber by the suction stroke of the engine flows into the auxiliary combustion chamber from said main combustion chamber through the passage with ascending movement of the piston in the compression stroke and is ignited by the spark plug provided in the auxiliary combustion chamber. As the mixture in the auxiliary combustion chamber is burned, the pressure in said chamber is elevated and the flame propagates into the main combustion chamber to stir up and rapidly burn the mixture staying therein. As a result, the burning condition is improved to prevent engine knock and ensure perfect combustion. Also, the mixture staying in the quenched portion in the main combustion chamber, where flame propagation is retarded, is efficiently burned to improve the operating performance of the engine while at the same time preventing the generation of unburned gases.

In such internal combustion engine, however, since the discharging gap of the spark plug is located in the auxiliary combustion chamber, that is, at a position spaced from the passage where gas velocity is high, the burned gas resulting from the mixture, after being ignited by the spark plug and burned during the working stroke of the engine, stagnates around the igniting portion of the spark plug, that is, in the vicinity of the discharging gap. The residual burned gas staying near the discharging gap is not entirely removed away even after the successive suction and compression strokes, and such gas excessively worsens the ignitability of the mixture. As a result, the engine tends to misfire in light-load or low-speed running to cause increased discharge of hydrocarbons, an unburned harmful component, and reduced engine performance.

One approach to the solution of this problem is a so-called stratified combustion type engine. In this type of engine, the easily ignitable rich mixture is supplied into the auxiliary combustion chamber and is ignited by the spark plug and burned, and the produced combustion gas is injected into the main combustion chamber through a passage to ignite and burn the lean mixture in the main combustion chamber. According to this system, however, since the mixture concentrations, or air-fuel ratios, in the main and auxiliary combustion chambers are different from each other, it is necessary to prepare two different types of mixture. Therefore, it is necessary to provide a fuel injection valve in the auxiliary combustion chamber or to provide an intake valve for supplying richer mixture into the auxiliary combustion chamber. Provision of such extra parts greatly complicates the mechanism of these fuel supply systems.

SUMMARY OF THE INVENTION

The present invention is aimed at realizing improvement of operating performance and purification of exhaust gas in the internal combustion engine using the lean mixture of same air-fuel ratio in both the main and auxiliary combustion chambers, by improving the mixture ignitability in the engine by removing the burned gases staying near the discharging gap of the spark plug without adopting such a complicated system as the one used in the stratified combustion type engine.

More specifically, there is provided according to the present invention an internal combustion engine having an auxiliary combustion chamber which is communicated with the main combustion chamber through a nozzle and a spark plug which is so disposed that its discharging gap is located adjacent the opening of said nozzle in the main combustion chamber, whereby when the mixture flows into the auxiliary combustion chamber from the main combustion chamber, any residual gas stagnating near the discharging gap of the spark plug is forced away by the flow of the mixture.

DESCRIPTION OF THE PREFERRED EMBODIMENT

Figure 1:
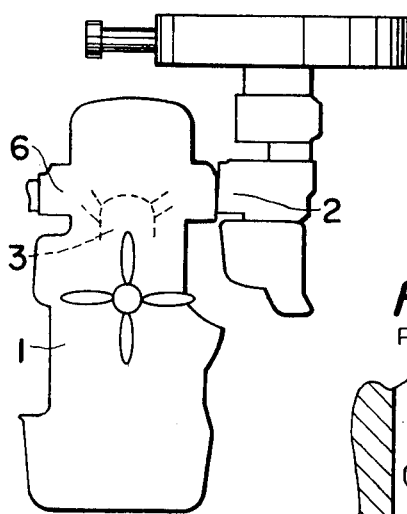
FIG. 1 is a rough sketch of an internal combustion chamber according to the present invention.
Figure 2:
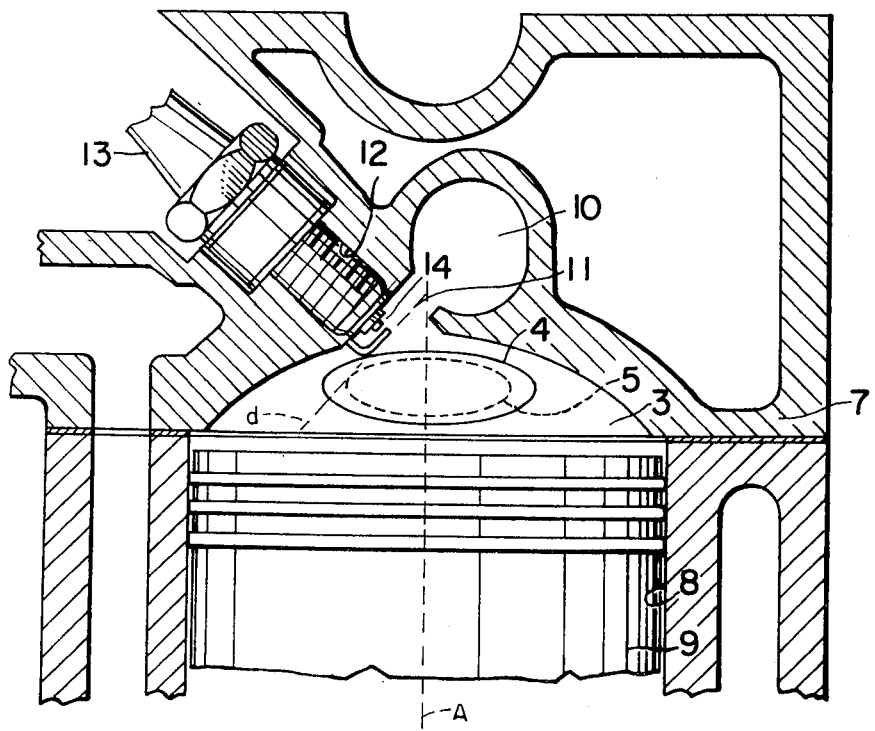
FIG. 2 is a sectional view of the essential parts of the internal combustion engine according to the present invention.

An internal combustion engine according to the present invention is now described in detail with reference to FIGS. 1 and 2.

The fuel-air mixture flows into a suction pipe 2 in the engine body 1 through a carburetor and other associated parts and then further flows through a suction valve 4 into the main combustion chamber 3 for combustion therein. Exhaust gas produced by combustion of the mixture is discharged out through an exhaust valve 5 and an exhaust pipe 6 into the atmosphere. The main combustion chamber 3 is defined by the cylinder 8, the upper end face of the piston 9 which reciprocates in said cylinder 8, and the inner wall of the cylinder head 7. In the cylinder head 7 and on the axial extension of the cylinder 8 is provided an auxiliary combustion chamber 10 formed with a nozzle 11 which opens into the main combustion chamber 3 and of which the center axial line C is at about 45° to the axis A of said cylinder 8. In the cylinder head 7 is also provided a tapped hole 12 which extends between a part adjacent said nozzle 11 and an outside part of the cylinder head such that the axis of said tapped hole 12 will be substantially at right angles to the axis of the nozzle 11, and a spark plug 13 is threadedly fitted in said hole 12. The discharging gap 14 of the spark plug 13 is located close to the opening of the nozzle 11 in the main combustion chamber 3. Although not shown, a high voltage is supplied to the spark plug 13 from an igniter. The setting angle of the spark plug 13 is determined depending on the configurations of the main combustion chamber 3 and auxiliary combustion chamber 10. The pattern of flow of the mixture and convenience for mounting and demounting of the spark plug 13 are also considered.

The operation of the present internal combustion engine having the above-described arrangements is now discussed. In the suction stroke of the engine, the intake valve 4 is opened to admit lean mixture into the cylinder 8 in accordance with descent of the piston 9. The thus taken-in mixture is compressed in the compression stroke of the engine and rushes into the auxiliary combustion chamber 10 from the main combustion chamber 3 through the orifice 11 while compressing the burned gas remaining in the auxiliary combustion chamber 10. At this time, the combustion gas produced by previous combustion and staying near the discharging gap 14 of the spark plug 13 is carried into the auxiliary combustion chamber 10 with the mixture flow. Thus, at the time of ignition immediately before completion of the compression stroke, the discharging gap 14 and its neighborhood are always filled with a fresh charge of mixture, so that ignition of the mixture won't be hindered by the residual burned gas and the mixture around the discharging gap 14 can be easily ignited with sparks produced in the discharging gap 14. When the mixture is ignited, its flame propagates into the mixture in the auxiliary combustion chamber 10 with the flow through the nozzle 11 to burn the mixture in the auxiliary combustion chamber 10 to produce high-temperature high-pressure combustion gas which rushes into the main combustion chamber 3 through the nozzle 11 to stir and ignite the mixture in the main combustion chamber 3 to effect rapid combustion of the mixture in the chamber. Thus, a very strong agitation is induced in the main combustion chamber 3 and also there exists in the chamber a greater amount of air than necessary for burning fuel. Nearly perfect combustion is thereby effected in the chamber to substantially arrest the production of harmful components such as unburned hydrocarbons or hydrogen monoxide.

During the ensuing exhaust stroke, burned gas is mostly discharged out of the main combustion chamber 3 by the operation of the piston 9 and exhaust valve 5, but a minor portion of combustion gas remains in the auxiliary combustion chamber 10. Thereafter, the above-said suction and compression strokes are repeated.

Figure 3:
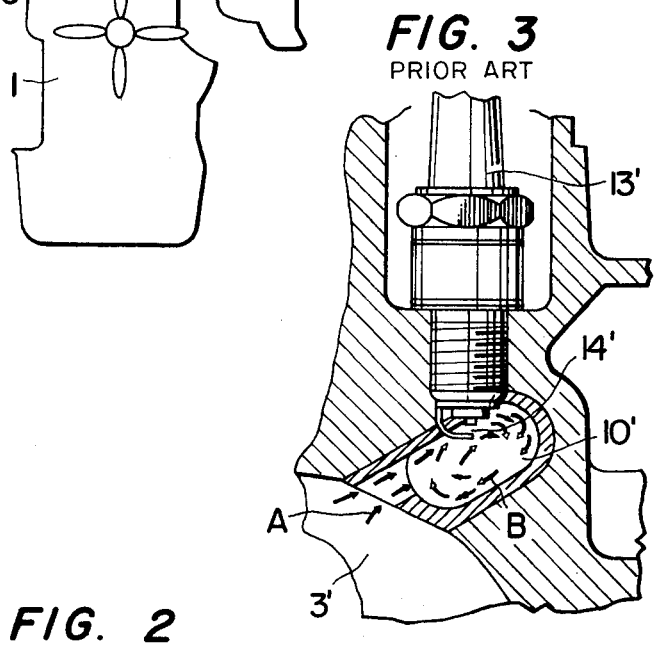
FIG. 3 is a diagrammatic illustration of a prior art internal combustion engine.

It will here be convenient for better understanding of the present invention to explain the combustion pattern which is observed when the discharging gap of the spark plug is provided in the auxiliary combustion chamber as in the conventional internal combustion engine having an auxiliary combustion chamber, with reference to FIG. 3. With a portion of combustion gas still remaining in the auxiliary combustion chamber 10', another fresh charge of mixture is guided into the main combustion chamber 3' in the ensuing suction stroke and is further compressed in the next compression stroke. In this case, only the admixture of fresh mixture charge shown by arrows A and said residual gas shown by arrows B is supplied to the vicinity of the discharging gap 14' of the spark plug 13', so that ignition by the spark plug 13' is not effected smoothly and thereby hinders combustion of the mixture in the step succeeding the compression stroke.

Figure 4:
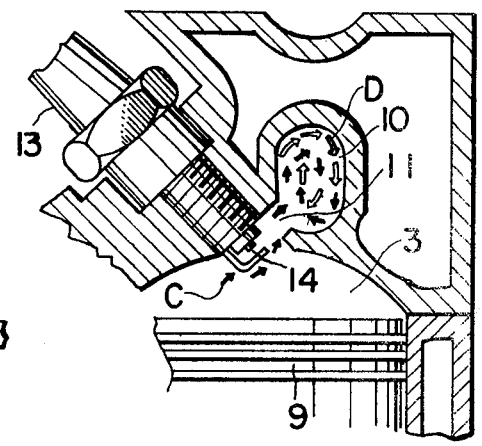
FIG. 4 is a diagrammatic illustration of an internal combustion engine according to the present invention.

However, according to the internal combustion engine of the present invention, as shown in FIG. 4, the discharging gap 14 of the spark plug 13 is located close to the opening of the orifice 11 in the main combustion chamber 3 then a fresh charge of mixture is supplied around the discharging gap 14 as shown by arrows C in the compression stroke, so that when ignited by the spark plug 13, the mixture around the discharging gap 14 forms a nucleus of flame, and hence the mixture containing residual gas indicated by arrows D in the auxiliary combustion chamber 10 is easily ignited and its flame induces stable combustion of the mixture in the main combustion chamber 3.

As described above, the internal combustion engine having an auxiliary combustion chamber according to the present invention is arranged such that residual gas staying around the discharging gap of the spark plug is forced away in the compression stroke, so that sure and positive ignition of the mixture in the auxiliary combustion chamber is effected and no misfire takes place in the engine even if no extra rich mixture is supplied into the auxiliary combustion chamber. It is therefore possible to use a lean mixture of the same air-fuel ratio in both main and auxiliary combustion chambers, and there is no need of providing a fuel injection valve or a suction valve in the auxiliary combustion chamber. Consequently, the mechanism of the engine, particularly the mechanism of the fuel supply system, is greatly simplified as compared with the stratified combustion type engines. Also, manufacture and maintenance of the engine can be accomplished with ease and at low cost. Further, the operating performance of the engine particularly in light-load run is improved owing to stabilized ignition. Still further, since arrangement is made such that the spark plug is threadedly fitted into a mating tapped hole which communicates the outside of the cylinder head and the neighborhood of the nozzle in the main combustion chamber, it is possible to locate the discharging gap close to said nozzle while using any known suitable type of spark plug. The tapped hole can be formed by using a known method, for which no specific working machine is required.

As understood from the foregoing explanations, the present invention finds its best application in an engine where a mixture suction valve is provided only on the main combustion chamber side and not on the auxiliary combustion chamber side.

What we claim is:

1. In an internal combustion engine operating with a lean fuel-air mixture for reducing harmful gas components in the exhaust, said engine comprising means defining a main combustion chamber, an intake valve, means for introducing a lean air-fuel mixture into said main combustion chamber through said intake valve, an exhaust valve, means defining an auxiliary combustion chamber without an intake valve in fluid communication with said main combustion chamber through a nozzle therein, and a spark plug for igniting the lean air-fuel mixture, the improvement comprising:

the spark gap of said spark plug being positioned adjacent to and substantially on the axis of said nozzle in the main combustion chamber.

2. In an internal combustion engine as claimed in claim 1, wherein the axis of said nozzle extends at an angle of about 45° relative to the axis of said main combustion chamber.

3. In an internal combustion engine as claimed in claim 1, wherein:

the means defining the main combustion chamber comprises a cylinder head, means defining a bore completely through said cylinder head, one end of said bore opening to the exterior of the cylinder head and the other end of said bore opening adjacent said nozzle, and said spark plug is threadingly fitted in said bore.

4. In an internal combustion engine as claimed in claim 3, wherein:

the axis of said nozzle is at an angle of about 45° relative to the axis of the main combustion chamber and the axis of said bore is substantially perpendicular to the axis of the nozzle.

5. In an internal combustion engine as claimed in claim 4, wherein:

the other end of said bore opens into said main combustion chamber so that the spark plug in the bore does not extend into the auxiliary combustion chamber.

6. In an internal combustion engine as claimed in claim 1 wherein:

the cross-sectional area of said nozzle is substantially less than that of the auxiliary combustion chamber.

7. In an internal combustion engine having means defining a main combustion chamber, an intake valve and an exhaust valve for said main combustion chamber, means defining an auxiliary combustion chamber without an intake valve, a nozzle fluidly connecting said main combustion chamber and said auxiliary combustion chamber, and a spark plug, the spark gap of which is located adjacent to and substantially on the axis of said nozzle in said main combustion chamber, the method of operation thereof comprising:

admitting a lean fuel-air mixture into said main combustion chamber through the opened intake valve during the intake stroke of the engine, forcing a part of the lean mixture together with the combustion gas of previous combustion near the gap into said auxiliary combustion chamber through the nozzle during the compression stroke of the engine, and then igniting the mixture by said spark plug to burn the mixture in the auxiliary combustion chamber whereby the flame produced by combustion of the mixture in the auxiliary combustion chamber rushes into the main combustion chamber through the nozzle to ignite the mixture in the main combustion chamber.

* * * * *